United States Patent [19]

Arad et al.

[11] Patent Number: 5,676,549

[45] Date of Patent: Oct. 14, 1997

[54] TOY FINGER PAINTING APPARATUS

[75] Inventors: Abraham A. Arad, Westport, Conn.; Anne Pitrone, New York, N.Y.; Barry Morgan, Stamford, Conn.

[73] Assignee: Toy Biz, Inc., New York, N.Y.

[21] Appl. No.: 384,425

[22] Filed: Feb. 6, 1995

[51] Int. Cl.⁶ .................. B44D 3/00; G09B 11/00
[52] U.S. Cl. .................. 434/84; 206/1.7; 434/85; 434/410
[58] Field of Search .................. 434/84, 85, 103, 434/101, 410; 206/1.7, 1.8; 273/240; 222/386

[56] References Cited

U.S. PATENT DOCUMENTS

| | | | |
|---|---|---|---|
| 381,553 | 4/1888 | Hollis | 222/386 |
| 1,193,181 | 8/1916 | Peck | 206/1.7 |
| 1,261,912 | 4/1918 | Ellis | 222/386 |
| 2,404,563 | 7/1946 | Berliner | 434/410 |
| 3,352,616 | 11/1967 | Linger | 206/1.7 |
| 3,416,231 | 12/1968 | Mercorelli | 439/85 |
| 3,581,882 | 6/1971 | Bish | 206/1.7 |
| 3,650,589 | 3/1972 | Linger | 206/1.7 |
| 3,786,913 | 1/1974 | Crawford | 206/1.8 |
| 3,802,904 | 4/1974 | Morrison | 434/84 |
| 4,591,056 | 5/1986 | Groch | 206/1.7 |
| 4,669,989 | 6/1987 | Jones et al. | 434/85 |
| 4,801,266 | 1/1989 | Kinberg | 434/410 |
| 5,083,925 | 1/1992 | Maruyama | 434/410 |
| 5,133,485 | 7/1992 | Ohno | 222/386 |
| 5,141,438 | 8/1992 | Spector | 434/84 |

Primary Examiner—Paul J. Hirsch
Attorney, Agent, or Firm—Robert F. Zielinski

[57] ABSTRACT

Toy painting apparatuses which provide means for finger painting a substrate without the user coming into direct contact with the paint. The painting apparatus has paint dispensing means and also provides a relatively thin, flexible, transparent, protective barrier between liquid paints that are dispensed onto the surface of a substrate and a user's fingers. The apparatus allows a user to apply paint to a substrate, such as paper, and manipulate the paint by smearing it with fingers, trowels, rollers and other similar implements which are moved across the surface of the barrier.

18 Claims, 5 Drawing Sheets

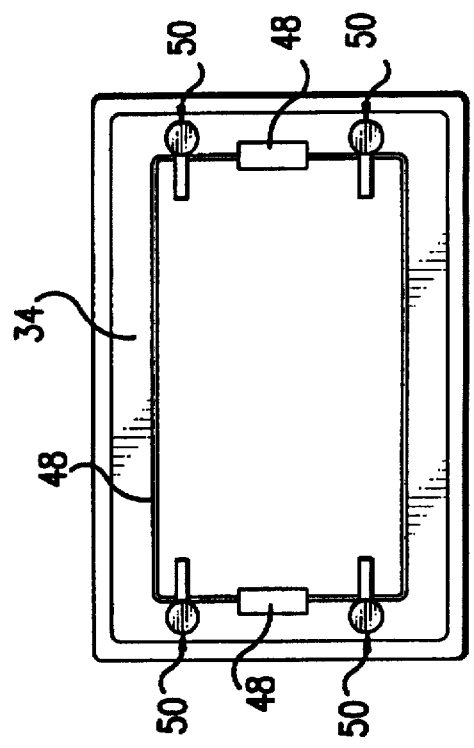
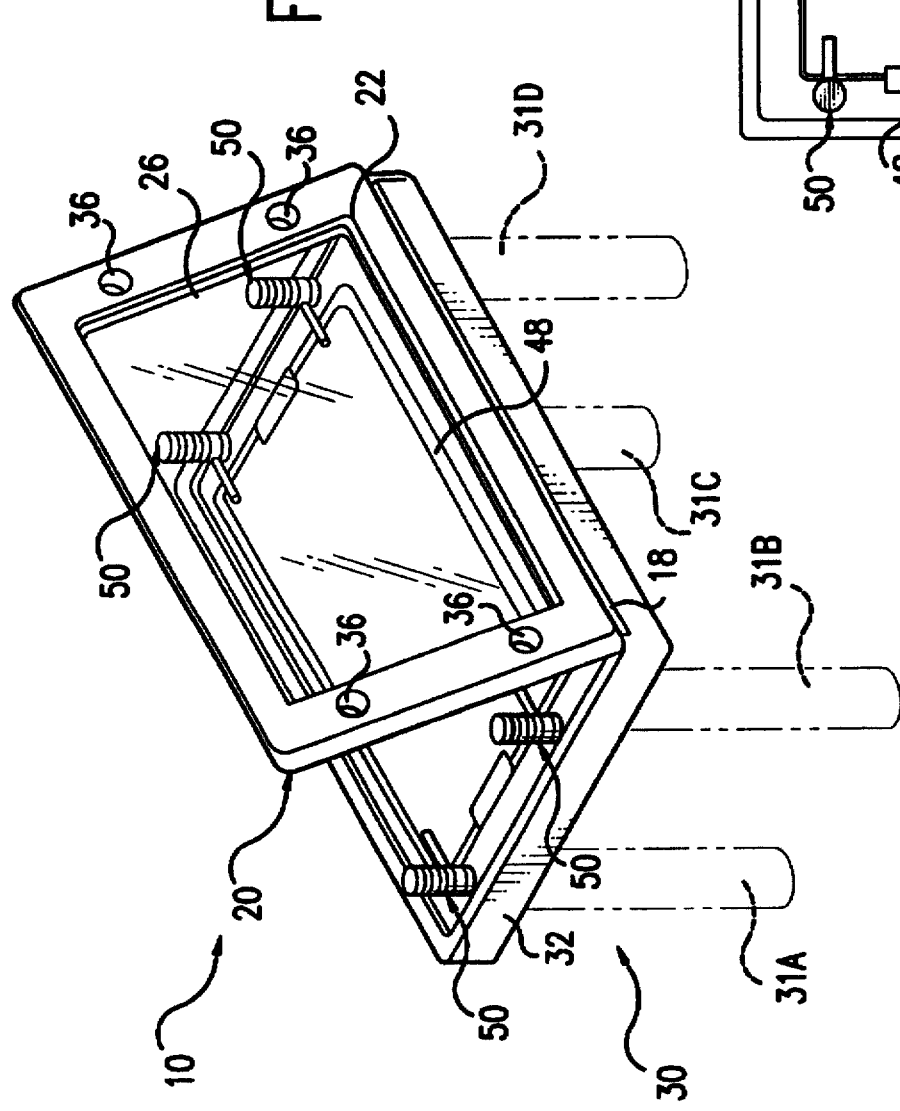

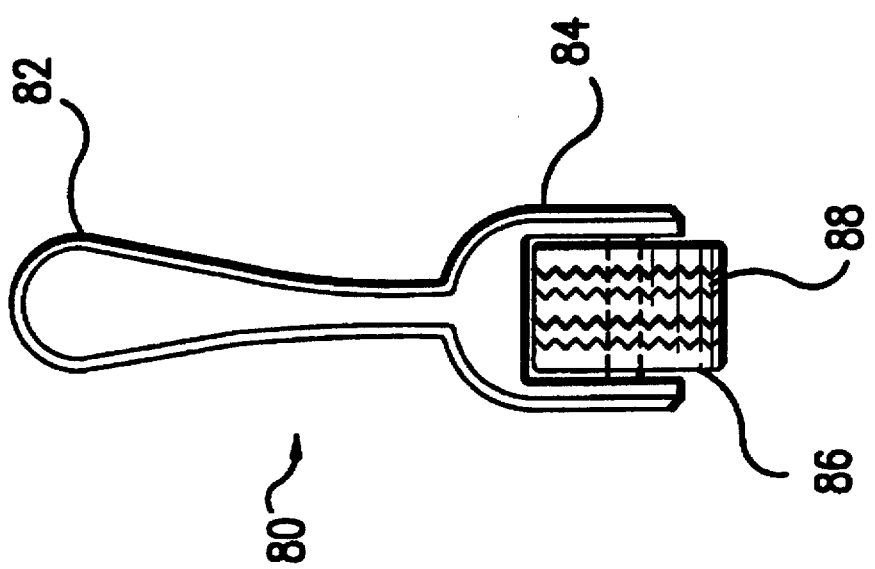

TOY FINGER PAINTING APPARATUS

BACKGROUND OF THE INVENTION

This invention relates generally to toy painting apparatuses, and more specifically, to a finger painting apparatus which permits a user to finger paint without direct contact with either the paint or the painted substrate.

Finger painting is doubtlessly one of the oldest forms painting expression. The components required are minimal: paint, paper or other similar substrate on which to place the paint, and a finger or other body part which can be used to smear the paint on the substrate. Finger painting's appeal is universal and because of its simplicity, it can be enjoyed by individuals with little or no artistic talent and by children and adults alike. In addition to its simplicity and enjoyability, finger painting has also been recognized as providing a psychologically satisfying experience for the painter. For children in particular, simple expressive activity is combined with the tactile stimulation of paint smearing. These elements, coupled with the immediate visual feedback which finger painting provides, not only enhance basic motor skills but are important to the educational, psychological and emotional development of the child. Indeed, finger painting has even been used as an adjunct to some forms of adult psycho-therapy as well as in the treatment of adult stroke victims.

Unfortunately, although finger painting in its conventional form has some advantages, it also suffers from numerous disadvantages. Finger painting is inherently messy and the finger paints themselves are all too often spilled easily and transferred from the intended surface to numerous unintended surfaces. The paints also take time to dry which makes handling of the painted substrate difficult. Finally, where there are children painters, both the painted substrate and the painting objects, i.e. fingers, have the tendency to smear paint on clothing and onto other objects which are wholly unintended, or which are not desired to be painted and which must then be cleaned.

In an effort to overcome the disadvantages of finger painting and as painting has evolved, numerous alternatives to simple finger painting have arisen. Perhaps the most obvious and ubiquitous development has been the use of a brush or other similar implement which eliminates at least partially, the need to immerse fingers directly into paint. While a good alternative to fingers, brushes have inherent limitations. Paint brushes lack the basic simplicity of finger painting, have limited useful lives, require periodic cleaning and maintenance and ultimately, replacement, which can be costly. Brushes also require a certain level of fine motor ability to use them satisfactorily and they may not be suitable as toys for all children. Finally, brushes too have a tendency to transfer paint to surfaces which are not intended to be painted.

As the painting art progressed, other types of "simple" toy painting apparatuses and painting systems have evolved. One recent example of such a device includes that disclosed in U.S. Pat. No. 4,023,524 to Goldfarb. That patent discloses a toy spray painting system which includes a hand-held, manually powered spray gun, an easel for holding a substrate such as paper for receiving paint from the spray gun and templates for creating designs on the substrate. While this toy may be an effective alternative to more expensive painting apparatuses, paint spray is inherently problematic in its potential to be directed to other than the intended surfaces. Additionally, this device requires some degree of artistic and motor skills to be used effectively and may not be appropriate for children. In reality, it is not at all a "simple" device.

Other examples of so called "simple" painting systems include those of the "spin-art" variety. In these apparatuses, liquid paint is poured or squirted onto a central portion of a substrate, typically, a heavy-stock cardboard, as the substrate is rotated on a turntable-like device at high speed. The high speed of rotation and the centrifugal force generated causes the paints to be pushed out to the substrate's edges creating a "sunburst" like image. While these apparatuses produce pleasant images, the images tend to bear a resemblance to one another by virtue of the manner in which they are made and, over time, the toy may lose its play appeal. Moreover, while these types of devices require little skill, the user can and often does come into direct contact with either the paint or the painted substrate, or both. Finally, these types of apparatuses have numerous moving parts, require electrical power and may not be suitable for use by children of all ages.

From the foregoing, it can be appreciated that prior art toy painting apparatuses and systems have some advantages. However, it is also obvious that they all suffer from certain common disadvantages, most notable of which is the messiness associated with their use due to paint smearing or splattering. Other "simple" apparatuses which attempt to overcome these shortcomings suffer from increasing complexity associated with the apparatus and often require the user to have additional artistic or motor skills beyond the rudimentary level. Finally, it will be appreciated that there is typically an increasing cost associated with these apparatuses and with other systems of greater complexity.

In view of the limited success provided by the prior art toy painting apparatuses, it will be appreciated that there is still a need for a painting system which is simple in approach and execution. It will also be appreciated that it may be desirable to have such systems which are inexpensive and which eliminate the need for complex attachments and/or devices which may require skill beyond that which ordinary individuals may possess. Additionally, it will be appreciated that it is also desirable to have a painting system which minimizes and/or eliminates the potential mess and unintentional transfer of paint to other objects.

It is, therefore, a primary object of the present invention to provide a toy painting system which avoids the messiness typically associated with finger painting.

It is also a primary object of the present invention to provide a toy painting system which is simple in approach and execution.

It is another object of the present invention to provide a toy painting system which includes a liquid paint dispenser having relatively few moving parts and which thereby eliminates the normal inherent breakdown in children's toys which contain a larger number of moving parts.

It is a further object of the present invention to provide a toy painting system of the type stated which enables a child to finger paint without directly contacting the paint and thereby generate an aesthetic pattern on a substrate.

It is also an object of the present invention to provide a toy painting system which is capable of generating multiple copies of a painting which can be derived from the original painting.

It is yet another object of the present invention to provide a toy paint apparatus of the type stated which eliminates direct contact with the paint.

It is still an additional object of the present invention to provide a painting system of the type stated which is of relatively simple construction which enables a child to operate it.

It is yet another salient object of the present invention to provide a method of permitting a child to generate paint patterns and designs on a substrate and, optionally, enhance these patterns and designs using a number of hand-held and hand-operated implements.

With the above and other objects in view, the present invention resides in the novel features of form, construction, arrangement, and combination of parts presently described in pointed out more particularly in the claims that follows.

SUMMARY OF THE INVENTION

The present invention relates in general to toy painting apparatuses which provide a means for finger painting on a substrate without the user coming into direct contact with the paint. In particular, the present invention provides a painting apparatus having paint dispensing means and which also provides a relatively thin, flexible, transparent, protective barrier between liquid paints that are dispensed onto the surface of a substrate and a user's fingers. The apparatus allows a user to apply paint to a substrate, such as paper, and manipulate the paint by smearing it with fingers, trowels, rollers and other similar implements which are moved across the surface of the barrier.

The painting apparatus of the present invention generally comprises a frame-like housing formed from semi-rigid, and preferably moldable plastic materials such as ABS. The housing includes a base member and a cover member and at least one paint dispensing assembly. The base member is of a generally rectangular, planar shape and includes an upper surface and a lower surface. On the upper surface of the base member, there is centrally disposed a substrate receiving or canvas area for holding a painting substrate, typically paper. Optionally, positioned on the upper surface of the base member at or near the peripheral edge of the canvas area are detentes or voids, or other similar mounting means such as twist and lock or bayonet mechanisms for detachably mounting at least one paint dispensing assembly. The apparatus may also include one or more compartments for storing design implements which may be used to create designs or patterns on a painted substrate surface. These compartments may also be used to store paint refills, extra paint dispensers and/or other decorative materials which may be applied on a painted surface, such as fixatives, glitter powder and the like. On the lower surface of the base member, there may be positioned a plurality of feet which extend downwardly which support the painting apparatus. Optionally, these feet may be situated at the terminal ends of legs which allow the apparatus to be supported on a table-like structure which is formed in the base. In other preferred embodiments, the painting apparatus may be constructed so as to be a "snap-in" or "drop-in" insert in a child's activity table or desk.

The cover member of the apparatus of the present invention is positioned, at least partially, over the base member. The cover member has an upper surface and a lower surface and preferably includes a means for detachably mounting the cover member to the base member. In one preferred embodiment the mounting means are mateable hinge and slot elements which are molded in the base and cover members. In other embodiments, the base and cover members may be secured via a rib and groove assembly or simply by compressive fitment of the base and cover member. Disposed generally centrally and in an area corresponding to the canvas area is a window opening. The window opening includes a flexible, transparent screen secured therein. The flexible screen is constructed of relatively thin, impermeable, vinyl plastic or other plastic materials. The screen may be from 1 to 20 mils. thick and is positioned above the canvas area with the paint dispensing assembly paint outlet being positioned in the canvas area between the lower surface of the plastic screen and the upper surface of the canvas area. In one preferred embodiment, the apparatus includes a gasket which is positioned between the flexible, transparent screen and the cover member. Preferably, the gasket is formed of a resilient, sponge-like material and provides a leak-proof seal around the peripheral edge of the canvas area so as to prevent paint from migrating outside of the canvas area. The gasket may also include recesses or be notched and be adapted to receive paint dispensing apparatuses for dispensing paint. Typically, the canvas area will hold a sheet of paper or other similar substrate onto which paint may be applied.

One preferred embodiment of the painting dispensing apparatus includes a generally cylindrical housing for holding liquid paint, a plunger or bellows mechanism and nozzle having at its terminal portion a paint outlet which extends inwardly above the surface of and into the canvas area. Preferably still, the nozzle and paint outlet are positioned slightly above and preferably are not directly in contact with a substrate which may be placed on the canvas area. In use, a user will apply pressure to the plunger mechanism which will cause paint to flow from the paint dispensing assembly onto the substrate. When the paint dispenser is emptied through use, the cover member may be opened, the dispenser removed from its mounting means, refilled and placed back into position for subsequent re-use.

In other preferred embodiments of the present invention, the paint dispensing means may simply be squeeze-bottle type dispensers which do not require mounting on the painting apparatus. In these embodiments, paint may be applied or "squirted" directly onto a substrate on the canvas area while the cover member is in the open position so as to enable access to the substrate. After paint has been applied, the cover may be closed and the paint may be manipulated, i.e., smeared, etc. with the barrier in place in the same manner as if the paint were applied via a paint dispensing assembly. It will be appreciated that either paint dispensing means (mounted and non-mounted) offer certain advantages. There the paint dispensing assembly is mounted, the painting apparatus is largely self-contained and easily transportable due to the unitized nature of the toy apparatus. When squeeze-type bottles are used, there may be greater flexibility in placing and selecting paint, although it may result in less secure storage of the paints and thereby decrease the transportability of the apparatus.

According to one embodiment of the apparatus of the present invention there may also be included optional design implements for creating decorative patterns on a painted substrate surface. These implements are preferably used on the surface of the flexible window screen to create design patterns, rather than directly on the painted substrate surface. Example of such implements include rollers, trowels, spatulas, rake-like devices and stamp-type impressions. By applying downward pressure of the implement on the screen surface after paint has been applied to the substrate, a decorative pattern may be imparted in the painted surface. Preferably, the design implements are constructed of rigid or semi-rigid plastic materials and do not have pointed, sharp or rough edges that could easily pierce or puncture the flexible window screen on which they are intended to be used. It will, however, be appreciated that the design implements may also be used directly on the painted surface after, for example, the painted substrate is removed from the canvas area.

In addition to minimizing the mess which is typically associated with finger paints, another advantage of the finger painting apparatus of the present invention is its ability to allow a user to make multiple copies of an image. For example, after a user has completed a painting and the substrate is removed from the canvas area, the insertion of a new, unused and clean substrate followed by the closure of the cover member will cause the flexible screen to come into contact with the new substrate and impart the paint image carried on the flexible screen in a manner similar to lithography or contact printing. In this manner, a user may make one or more contact copies of the original painting from the paint remaining on the screen surface.

BRIEF DESCRIPTION OF THE DRAWINGS

FIG. 3 is a side perspective view of an alternate embodiment of the painting apparatus of the present invention.

FIG. 4 is a top-plan view of an alternate embodiment of the base member of the painting apparatus shown in FIG. 4.

FIG. 7 is a side view of a design implement of the type used in the present invention.

DETAILED DESCRIPTION OF THE DRAWINGS

Figure 1:
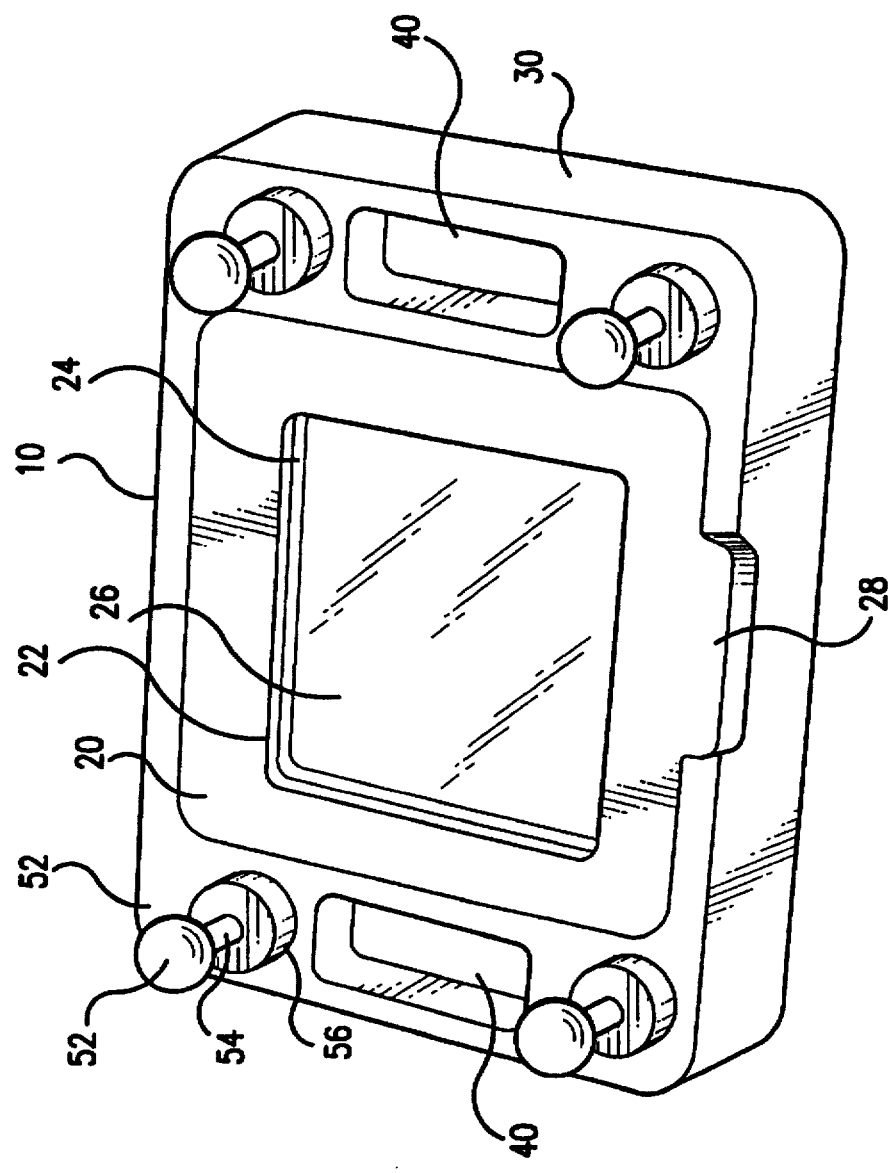
FIG. 1 is a perspective view of one preferred embodiment of the painting apparatus of the present invention.

Referring now in greater detail to the various figures of the drawing wherein like reference characters refer to like parts, there is shown in the various figures, a painting apparatus constructed in accordance with the teachings of this invention.

In FIG. 1, there is shown the frame-like housing of painting apparatus 10 which includes cover 20 positioned on base 30. Cover 20 includes window opening 22 which is generally a centrally disposed opening or void within cover 20. Positioned beneath the lower surface of cover 20 is gasket 24. Gasket 24 may be adhesively secured to the lower surface of cover 20 at or near the periphery of window opening 22 by any number of known securement means such as glue, adhesive strips, hot melt glues, etc. Alternatively, gasket 24 may be compressively fitted within a channel or groove which extends around the periphery of the window opening on the lower-cover surface. Adhesively secured preferably on the opposite surface of gasket 24 is flexible screen 26. Flexible screen 26 is preferably constructed of a relatively thin, clear, light-weight, durable, plastic materials. Suitable materials for use in the flexible screen include film and sheet material made of polyvinyl, polyester, polyethylene, acetate, nylon as well as other plastic materials having these properties. A preferred material is polyvinyl. Preferably, the screen is from 1 mils. to 20 mils. thick and more preferably from approximately 3 to 10 mils thick. Preferred materials are also impermeable and non-reactive with the paint and other materials utilized in the painting apparatus. It is also preferable that the screen materials are durable, relatively puncture and tear resistant and are also, at least partially, elastic in nature. Cover 20 also includes cover handle 28 which facilitates opening cover 20 for the insertion and removal of painting substrate and paint dispensing assemblies.

Figure 2:
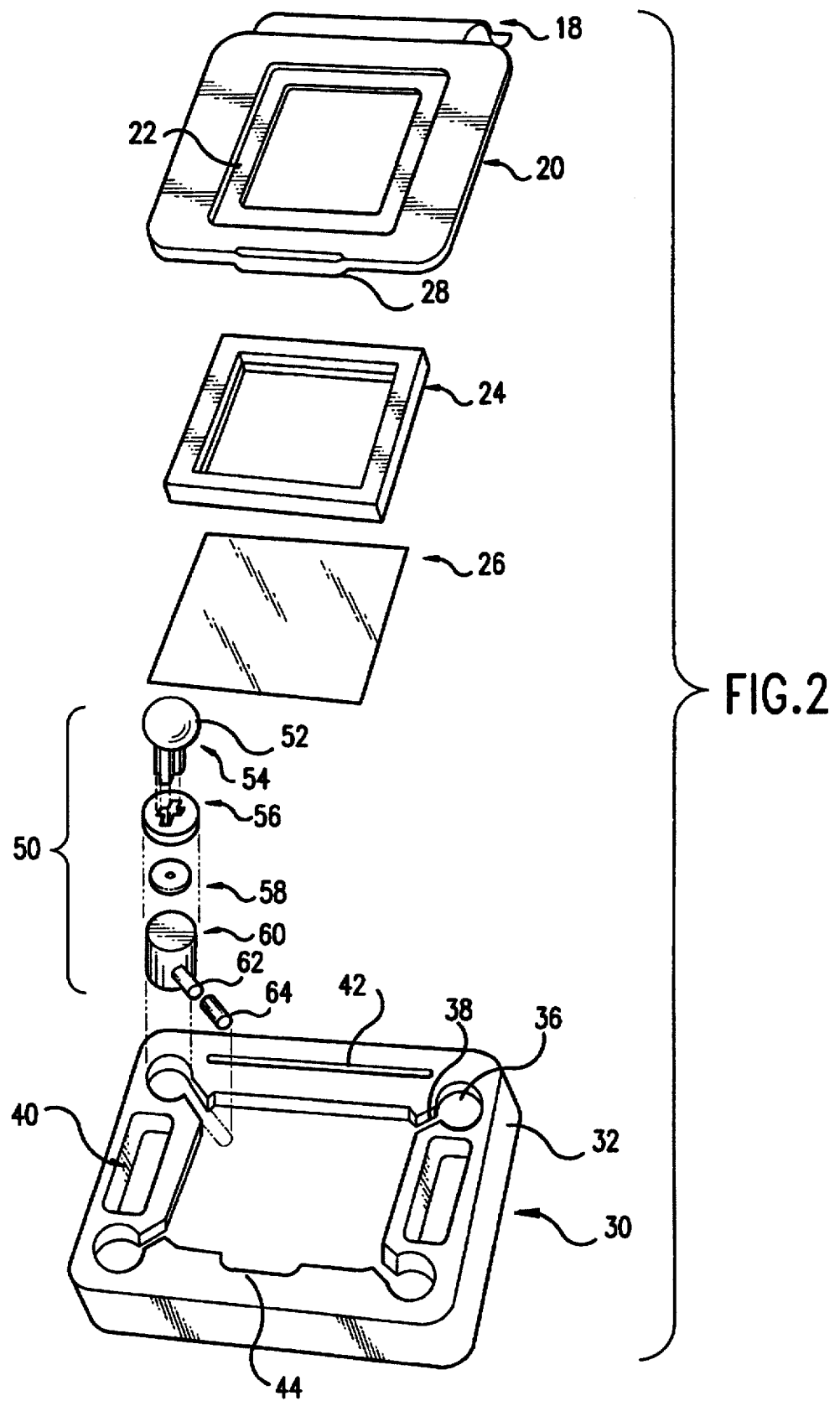
FIG. 2 is an exploded perspective view of the apparatus shown in FIG. 1.

In FIG. 2 is shown an exploded perspective view of the painting apparatus shown in FIG. 1. Situated on one peripheral edge of cover 20 is hinge element 18 which is molded into or which may be formed as part of cover 20. Adhesively or otherwise mechanically secured to one surface of gasket 24 is flexible screen 26. In alternative embodiments of the invention, gasket 24 may be omitted and flexible screen 26 may be affixed directly to the lower surface of cover 20 at or near the peripheral edge of window opening 22. In some embodiments of the painting apparatus of the present invention, it may be desirable to change or alter certain characteristics of flexible screen 26. In these embodiments, flexible screen 26 may be detachably mounted to cover 20, thus enabling a user to change screens for a variety of surface effects and patterns which may be imparted by the screen. Some surface effects may be imparted by the surface-tension and surface characteristics (i.e., elasticity, tautness, etc.) of the material comprising the flexible screen while other effects may be imparted by patterns or textures which are formed in the surface of the screen.

Positioned below cover 20 is base 30 having base sidewalls 32 which extend downwardly from the upper surface of the base. Positioned generally centrally within base 30 and in structural alignment with opening 22 is canvas area 34. In the embodiment shown, canvas area 34 is recessed below the plane of the upper surface of base 30, although it will be seen that in an alternative embodiment, such as those disclosed in FIGS. 4 and 5, canvas area 34 may essentially be "co-planar" with the upper surface of the base member. In the embodiment shown, canvas area 34 is likewise adapted to receive a substrate, typically paper, or cardboard reinforced paper. Extending outwardly from its periphery, and in communication with canvas area 34 are paint conduit channels 38 in communication with paint dispenser apertures 36. Paint dispenser apertures 36 are adapted to detachably receive at least one paint dispenser assembly designated generally at 50.

In the embodiment shown by FIGS. 1 and 2, paint dispenser aperture 36 includes a recess or detent within the upper surface of base 30 adapted to mateably receive the paint dispenser assembly. It will be appreciated, however, that in other alternative embodiments, other mounting and/or coupling means may be employed. Additionally, although in the embodiment shown in FIGS. 1 and 2, paint conduit channel 38 is fixed, in other embodiments, such as those shown in FIGS. 3 and 4, base member 30 may be constructed so as to provide for movement of the dispensers freely about the periphery of canvas area 34. As also shown by the drawings, base 30 may also include a pair of compartments 40 which may be used to receive and house materials used in connection with the painting apparatus. Also disposed on the upper surface of base 30 is hinged slot 42 for receiving hinge 18 and cover handle recess 44 adapted to receive cover handle 28.

As shown by FIGS. 1 and 2, cover 20 is shown positioned generally in alignment with the cavity or recess in which canvas area 34 on base 30 is situated. Connected to cover 20 and also positioned above the canvas area are gasket 24 and flexible window 26. Gasket 24 may rest at or near the peripheral edge of canvas area 34 and flexible window 26 is positioned above canvas area 34 so that a substrate may be positioned therein and held in place by the downward pressure of the cover at the gasket substrate interface. Cover 20 and base 30 may also include tab and groove means (not shown) to secure, albeit temporarily, lock cover 20 in place.

In this manner, gasket 24 also serves as a substrate retention means. Also shown on the cross-sectional view are a pair of compartments 40 which may be generally coplanar with canvas area 34. On the outer peripheral edge of canvas area 34 is at least one paint-dispensing means 50 having nozzle 62 and paint outlet part 64 which extend into canvas area 34 via paint conduit channel 38. In use, paint is discharged into the canvas area and is manipulated by smearing or with tools on a substrate surface via movement across and through the surface of the flexible screen.

FIG. 3 shows an alternative, preferred embodiment of the painting apparatus of the present invention. In this embodiment, cover 20 extends substantially over the surface of base 30 and is connected to the base member via hinge 18. Disposed within cover 20 is window-opening 22 which may be further defined at the outer upper peripheral edges by a bevel or slope formed within the cover. Positioned below cover 20 and in general structural alignment with window-opening 22 is gasket 24. Gasket 24 may be constructed of foam cell plastic, rubber or other suitable materials which are resilient, compressible and capable of forming a substantially leak-proof seal for the paint. Cover 20 includes a plurality of cover apertures 70 which are in structural alignment with paint dispensing assembly 50 positioned on the base 30. Paint dispensing assembly 50 is mounted to base 30 via detents or voids 36 which may also include "twist and lock" mechanisms or other similar structural mechanisms for detachably mounting paint dispenser assembly 50 onto base 30. In other preferred embodiments (not shown) paint dispensing assembly 50 is not mounted directly on the painting apparatus. In these embodiments, the paint dispenser may be a squeeze bottle or other similar type of dispenser from which paint may be dispensed onto a substrate within canvas area 34. It will be appreciated that cover 20 will be in an open position (or otherwise removed) to provide access to a substrate and then moved to a closed position prior to manipulation of the painting by a user's fingers or other design implements. In this embodiment, paint dispensers 50 are pivotally mounted so as to provide limited arcuate movement across the surface of canvas area 34. Extending downwardly from the lower surface of base 30 are optional legs 31 A-D, shown in phantom detail, for supporting the painting apparatus. In other embodiments, the painting apparatus may be constructed so as to form a "snap-in" or "drop-in" insert to a child's activity desk.

Referring now to FIG. 4, there is shown the upper surface of the base member of the painting apparatus shown in FIG. 3. Disposed on and part of base 30 is canvas area 34 which may be defined on at least one side by substrate retainer 46. Substrate retainer 46 may be clips, slots, grooves, adhesive strips or other similar means for temporarily securing a substrate to base 30. In the embodiment shown, base 30 also includes gasket lip 48 configured to receive gasket 24 at a peripheral edge thereof. Gasket lip 48 is also in general structural alignment with window opening 22 of cover 20 and may further define canvas area 34.

Figure 6:
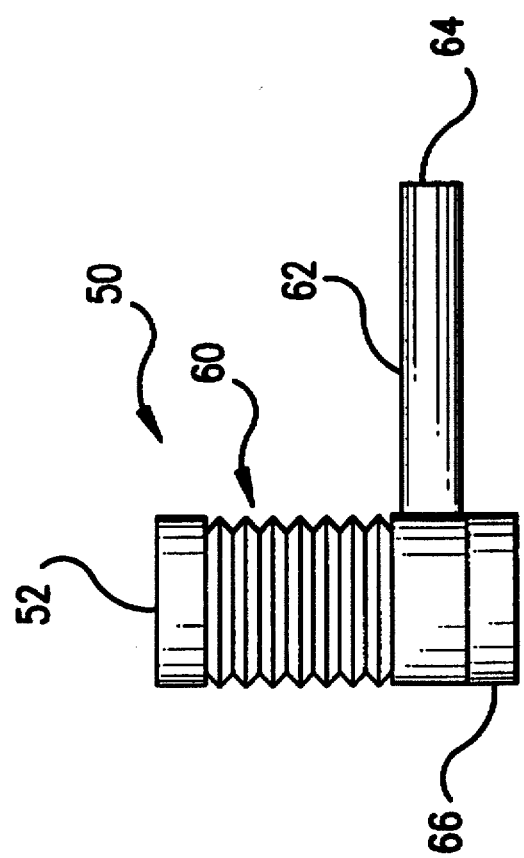
FIG. 6 is a side view of an alternate embodiment of a paint dispensing device used in the apparatus of the present invention.
Figure 5:
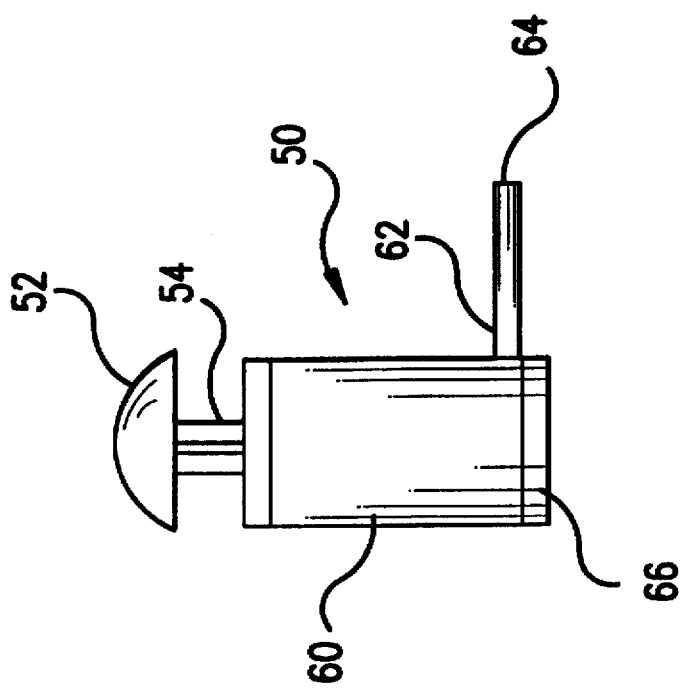
FIG. 5 is a side view of one embodiment of a paint dispensing device used in the apparatus of the present invention.

In FIG. 5 and 6 are shown paint dispensing apparatuses of the type used in the present invention. In FIG. 5, dispenser assembly 50 includes plunger head 52 connected via stem 54 to plunger bottom 58. Positioned between the plunger head and the plunger bottom is cylinder cover 56. Cylinder cover 56 is configured to be received by the upper end of paint cylinder 60. Paint cylinder 60 comprises a generally hollow cylinder for receiving liquid paint and is in fluid communication with paint outlet 64 on paint nozzle 62.

In FIG. 6, there is shown an alternative embodiment on the paint dispensing apparatus of the present invention. In this embodiment, paint cylinder 60, comprises an expandable and contractible bellows configuration. Positioned above paint cylinder 60 is plunger head 52 which may also function as a cap or other demountable sealing means for filling the dispenser assembly with paint. Positioned at the end opposite cap 52 is dispenser spacer 66 which provide a mounting mechanism for the dispensers assembly on the base member, it also permits the dispensers assembly to be mounted above the plane of the substrate onto which paint is to be released.

In FIG. 7, there is shown one design implement 80 of the type typically used in the present invention. In the embodiment shown, design implement 80 includes at one end handle 82 and at the opposite end design carrier 84 holding an interchangeable wheel, design embosser 86. In this embodiment, the design implement is a roller-type device with the design embosser being raised designs 88 carried on the wheel surface. In other embodiments, the design embossers may simply be a raised stamp or stamp-like projections temporarily or permanently secured to a handle which are capable of imparting a surface impression on the flexible screen with downward pressure and which may also be carried on a handle-like implement.

While the invention has been described in connection with what are considered to be the most practical and preferred embodiments, it is understood that the invention is not limited to the disclosed embodiments but, on the contrary, is intended to cover various modifications and equivalent arrangements included within the spirit and scope of the appended claims.

What is claimed is:

1. A painting apparatus for manually manipulating paint having a frame-like housing comprising:
   - a base member having an upper surface, a lower surface and a substrate receiving area disposed on said upper surface;
   - a cover member mateably received by said base member, said cover member having a window opening and a transparent flexible screen disposed therein, said screen having an upper screen surface and a lower screen surface, said screen in structural alignment with and covering at least a portion of said substrate receiving area; and
   - flowable paint dispensing means for storing and dispensing paint, said paint dispensing means being in fluid communication with said substrate receiving area.

2. The painting apparatus of claim 1 wherein said paint dispensing means includes at least one paint outlet port, said means being detachably mounted on said housing and further wherein said port is positioned below said lower screen surface.

3. The painting apparatus of claim 1 further including means for securing said cover member to said base member.

4. The painting apparatus of claim 3 wherein said means for securing is selected from the group consisting of hinges; dowels and apertures; grooves and beads; and compressive fitment.

5. The painting apparatus of claim 1 wherein said paint dispensing means is detachably mounted on said apparatus.

6. The painting apparatus of claim 1 wherein said transparent flexible screen is constructed of plastic material.

7. The painting apparatus of claim 6 wherein said plastic material is selected from the group consisting of acetates, polyvinyls, polyesters, polyethylenes, polycarbonates and nylons.

8. The painting apparatus of claim 6 wherein said plastic material is approximately 1 to 10 mils thick.

9. The painting apparatus of claim 8 wherein said plastic material is approximately 3 to 6 mils. thick.

10. The painting apparatus of claim 1 further including a resilient gasket positioned between the peripheral edge of said window opening and said upper screen surface.

11. The painting apparatus of claim 1 further including a plurality of legs extending downwardly from said base member lower surface.

12. A painting apparatus comprising a housing having a frame-like construction comprising:

a generally planar base member having an upper surface plane, a lower surface plane and a substrate receiving area plane;

a cover member hinged to said base member, said cover member having a centrally disposed window opening therethrough, a resilient gasket secured on a first gasket surface to the lower peripheral edge of said window opening and secured on a second gasket surface to a transparent flexible plastic screen, said screen having an upper screen surface and a lower screen surface, said screen being positioned above said substrate receiving area; and at least one paint dispensing apparatus for storing and dispensing paint, said dispensing apparatus comprising a cylinder having a cylinder having a cylinder opening at one end and a paint outlet at its opposite end, said cylinder including a plunger assembly disposed therein, said plunger assembly comprising a plunger head and a plunger bottom positioned on opposite ends of a plunger stem, a cylinder cap for sealing said cylinder opening and further having a stem opening for slidably receiving said stem therein, said paint outlet having a paint nozzle and a paint outlet port, said port being positioned below said lower screen surface and being in fluid communication with said substrate receiving area.

13. A children's toy finger painting system for dispensing a finger paint composition onto a substrate, said system comprising:

a. frame means having a base member and a cover member, said cover member having a window opening therein, b. substrate securing means for securing a paint receiving substrate to a substrate receiving area on said frame means, c. paint dispensing means operatively associated with said frame means for dispensing liquid paint onto said paint receiving substrate, and d. a transparent, flexible barrier means for said liquid paint wherein said barrier means permits movement of said paint across said substrate without direct physical contact with said paint, said barrier means being positioned within said window in said cover and in general structural alignment with said substrate receiving area.

14. The finger painting system of claim 13 further comprising:

at least one paint dispensing container detachably mounted to said frame means for receiving a liquid paint composition therein, and said container having a generally upright tube defining a contractible and expandable chamber having a paint outlet port at its lower end, said chamber capable of expelling paint upon reduction in size and capable of receiving paint upon increase in size and further including means for causing reduction or increase in the size of said chamber.

15. The finger painting system of claim 13 wherein frame means further includes securing means for detachably securing said base member to said cover member.

16. The finger painting system of claim 15 wherein said securing means is a hinge assembly.

17. The finger painting system of claim 13 wherein said barrier means is selected from the group consisting of acetates, polyvinyls, polyesters, polyethylenes, polycarbonates and nylons.

18. The finger painting system of claim 13 wherein said barrier means is polyvinyl and further includes a hinge for detachably securing said base member to said cover member.

* * * * *